(12) United States Patent
Isozaki et al.

(10) Patent No.: US 6,173,412 B1
(45) Date of Patent: Jan. 9, 2001

(54) APPARATUS AND METHOD FOR INITIALIZING A WRITEABLE/ NONVOLATILE MEMORY DEVICE

(75) Inventors: Atsushi Isozaki, Ichinomiya; Junji Hatamura, Nagoya, both of (JP)

(73) Assignee: Brother Kogyo Kabushiki Kaisha, Nagoya (JP)

( * ) Notice: Under 35 U.S.C. 154(b), the term of this patent shall be extended for 0 days.

(21) Appl. No.: 09/039,455

(22) Filed: Mar. 16, 1998

(30) Foreign Application Priority Data

Mar. 21, 1997 (JP) ..................................................... 9-085598

(51) Int. Cl.[7] .................. G06F 9/445; G06F 9/06
(52) U.S. Cl. ......................................... 714/5; 714/7; 713/1
(58) Field of Search ........................... 714/5, 7, 13; 713/1

(56) References Cited

U.S. PATENT DOCUMENTS

| | | | |
|---|---|---|---|
| 4,711,560 | * 12/1987 | Hosaka et al. ..................... 355/14 C |
| 5,083,264 | * 1/1992 | Platteter et al. ..................... 395/575 |
| 5,089,958 | * 2/1992 | Horton et al. ..................... 395/575 |
| 5,093,915 | * 3/1992 | Platteter et al. ..................... 395/700 |
| 5,444,850 | * 8/1995 | Chang ............................... 395/200.1 |
| 5,544,356 | * 8/1996 | Robinson et al. .................. 395/600 |
| 5,712,969 | * 1/1998 | Zimmermann et al. ......... 395/182.03 |
| 5,819,087 | * 10/1998 | Le et al. ............................. 395/652 |
| 5,935,242 | * 8/1999 | Madany et al. ......................... 713/1 |

\* cited by examiner

*Primary Examiner*—Ly V. Hua
(74) *Attorney, Agent, or Firm*—Oliff & Berridge, PLC

(57) ABSTRACT

An electronic apparatus having a ROM disposed in a data processing apparatus, and a writeable and nonvolatile memory device storing an operation setting value of the ROM is provided. When powered on, the apparatus determines whether the ROM has been changed or replaced. If it is determined that the ROM has been changed, the apparatus writes the initial values of the ROM into the memory device. Thereby, the device eliminates the need for a person to perform the rewriting operation on the writeable and nonvolatile memory device even when the ROM has been replaced.

21 Claims, 3 Drawing Sheets

Fig. 3

| | T2 | MR | CORRECTION TYPE | NECESSARY BIT | SUB-TOTAL | CHANGE/ 1STEP | INITIAL VALUE | FSW NO. | BIT | INITIAL VALUE |
|---|---|---|---|---|---|---|---|---|---|---|
| CONTRAST FACTOR (AUTO) | ○ | ○ | ABSOLUTE VALUE | | | | | | | |
| CONTRAST FACTOR (DARK) | ○ | ○ | ABSOLUTE VALUE | | | | | | | |
| CONTRAST FACTOR (LIGHT) | ○ | ○ | ABSOLUTE VALUE | | | | | | | |
| CONTRAST COPY (AUTO) | ○ | ○ | ABSOLUTE VALUE | | | | | | | |
| CONTRAST COPY (DARK) | ○ | ○ | ABSOLUTE VALUE | | | | | | | |
| CONTRAST COPY (LIGHT) | ○ | ○ | ABSOLUTE VALUE | | | | | | | |
| CONTRAST FACTOR (MAINTENANCE) | ○ | ○ | ABSOLUTE VALUE | | | | | | | |
| EDGE ENHANCEMENT | ○ | ○ | ABSOLUTE VALUE | | | | | | | |
| EDGE ENHANCEMENT | ○ | ○ | ABSOLUTE VALUE | | | | | | | |
| RECORDING SHEET | | | ABSOLUTE | | | | | | | |

APPARATUS AND METHOD FOR INITIALIZING A WRITEABLE/NONVOLATILE MEMORY DEVICE

BACKGROUND OF THE INVENTION

1. Field of Invention

The invention relates to an apparatus and method for initializing a writeable and nonvolatile memory device. More particularly, the invention relates to initializing a writeable and nonvolatile memory device by storing an operation setting value stored in a ROM when powered is applied.

2. Description of Related Art

Many electronic devices, such as printers or facsimiles, are equipped with writeable and nonvolatile memories. In a device in which operation setting values are stored in a writeable and nonvolatile memory, for example, an EEPROM, initial values stored in the ROM are also stored in the EEPROM before shipment.

After being shipped, such electronic devices may experience a situation where the ROMs need to be replaced with ROMs storing different contents due to debugging of control programs or changes in the specification, for example. The replacement of ROMs is normally performed by servicepersons, at service centers, office computer technicians, or the like. Since initial values of a new ROM have been changed, it is necessary to write the initial values into the EEPROM when the new ROM is installed.

This rewriting operation is normally performed manually by servicepersons. However, servicepersons may make mistakes. If a serviceperson fails to properly rewrite initial values, the electronic device becomes unable to operate properly. Reliability problems thus arise.

If a serviceperson replacing a ROM is uninformed that the contents of the replacement ROM have been altered, the serviceperson would not perform the initial value rewriting operation. That is, the serviceperson would not store the initial values stored in the new ROM into the EEPROM.

SUMMARY OF THE INVENTION

Accordingly, an electronic apparatus is provided having a writeable and nonvolatile memory device which may not need a person to perform a memory rewriting operation, even when a ROM is replaced. A method for initializing the memory device is also provided.

The writeable/nonvolatile memory-equipped electronic apparatus may include a ROM provided in a data processing device, and a writeable and nonvolatile memory device that stores an operation setting value. A determination device is also provided which, when powered on, determines whether there is a change in the storage contents of the ROM. When the determination device determines that there is a change in the storage content of the ROM, a first writing device initializes the memory device by writing the initial value stored in the ROM into the memory device.

When powered on, the determination device may also compare a checksum value stored in the ROM and a value stored in a predetermined area in the memory device. If the checksum value differs from the value stored in the predetermined area, the determination device determines that the ROM has been changed.

When powered on, the determination device may also determine whether the ROM has been changed by comparing a value stored in one high order byte of the checksum stored in the ROM and a value stored in one byte in the predetermined area of the writeable and nonvolatile memory device.

The electronic apparatus may further include a second writing device, separate from the first writing device, that writes into the memory device a value to be used in order to determine whether there is a change in the storage content of the ROM. The second writing device may write into the memory device after the memory device is initialized by the first writing device.

The electronic apparatus may also have the following structure. The checksum stored in the ROM may be provided in a two-byte storage area, and the value stored in the predetermined area of the memory device is provided in a two-byte storage area. A high/low comparison device may be provided which compares the checksum value stored in the high order byte and the checksum value stored in the low order byte of the two-byte storage area of the ROM in order to determine whether there is a change in the storage content of the ROM.

If the high/low comparison device determines that the value stored in the high order byte of the checksum differs from the value stored in the low order byte of the checksum, a second determination device may be provided which determines whether the ROM has been replaced by comparing the value stored in the low order byte of the checksum and a value stored in the low order byte of the two-byte storage area of the predetermined area in the memory device. However, if the high/low comparison device determines that the value stored in the high order byte of the checksum equals the value stored in the low order byte of the checksum, the second determination device compares a value obtained by adding a predetermined value to the value stored in the low order byte of the checksum and the value stored in the low order byte of the two-byte storage area of the predetermined area in the memory device.

The electronic apparatus may also be structured as follows. In a situation where the second determining device determines that the ROM has been replaced, because the high/low comparison device has determined that the value stored in the high order byte of the checksum of the ROM differs from the value stored in the low order byte of the checksum, the high/low comparison device determines that the second writing device may write the value stored in the low order byte of the checksum of the ROM into the low order byte of the predetermined two-byte storage area in the memory device. However, if the high/low comparison device has determined that the value stored in the high order byte of the checksum of the ROM equals the value stored in the low order byte of the checksum, the second writing device may write the value obtained by adding the predetermined value to the value stored in the low order byte of the checksum of the ROM into the low order byte of the predetermined two-byte storage area in the memory device. The predetermined value to be added may be 1.

An initializing method may also be provided to be performed on a writeable and nonvolatile memory device when the electronic apparatus is powered on. The method may include the following steps. In one step, a checksum storage area is provided in a ROM for storing a checksum. In another step, a checking storage area is provided in a predetermined area in a writeable and nonvolatile memory device. In a first comparing step, a value stored in the checksum storage area in the ROM is compared with a value stored in the checking storage area in the memory device. If it is determined in the first comparing step that the value stored in the checksum storage area differs from the value stored in the checking storage area, the memory device is initialized in an initializing step. In a writing step, the value stored in the checksum storage area in the ROM is written into the checking storage area in the memory device.

The method may have further additional steps as follows. Two bytes are provided for the checksum storage area in the ROM, and two bytes are provided for the checking storage area in the predetermined area in the writeable and nonvolatile memory device. In a first comparing step, a value stored in one high order byte of the checksum storage area in the ROM is compared with a value stored in one high order byte of the predetermined area in the memory device. In an initializing step, the memory device is initialized if it is determined in the first comparing step that the value stored in the high order byte of the checksum storage area differs from the value stored in the high order byte of the checking storage area. In a writing step, the value stored in the high order byte of the checksum storage area in the ROM and a value stored in the low order byte of the checksum storage area are written into the memory device.

The method may have further steps as follows. If it is determined in the comparing step that the values are equal, it is then determined in a high/low determining step whether the value stored in the high order byte of the checksum of the ROM equals the value stored in the low order byte of the checksum. If it is determined in the high/low determining step that the values are equal, a value obtained by adding a predetermined value to the value stored in the low order byte of the checksum is compared with a value stored in the low order byte of the predetermined area of the memory device in a second comparing step. If it is determined in the second comparing step that the values are different, the memory device is initialized in an initializing step. In a writing step, the value stored in the high order byte of the checksum of the ROM and the value obtained by adding the predetermined value to the low order byte of the checksum are written into the memory device.

If the initial data of the checksum of the ROM differs from the initial checking data stored in the writeable and non-volatile memory device, the memory device is immediately initialized and updated by writing the two-byte data into the predetermined checking area in the writeable and nonvolatile memory device. Therefore, the memory device always contains the latest checking data.

Even if the valued stored as a checksum of a new ROM happens to be equal to that of an old ROM, or even if the entire area of a writeable and nonvolatile memory device has been initialized to certain values, the invention enables comparison between the checking value stored in the memory device and the checksum of the new ROM.

BRIEF DESCRIPTION OF THE DRAWINGS

A preferred embodiment of the present invention will be described in detail with reference to the following figures wherein:

FIG. 3 shows examples of initial values.

DETAILED DESCRIPTION OF PREFERRED EMBODIMENTS

Figure 1:
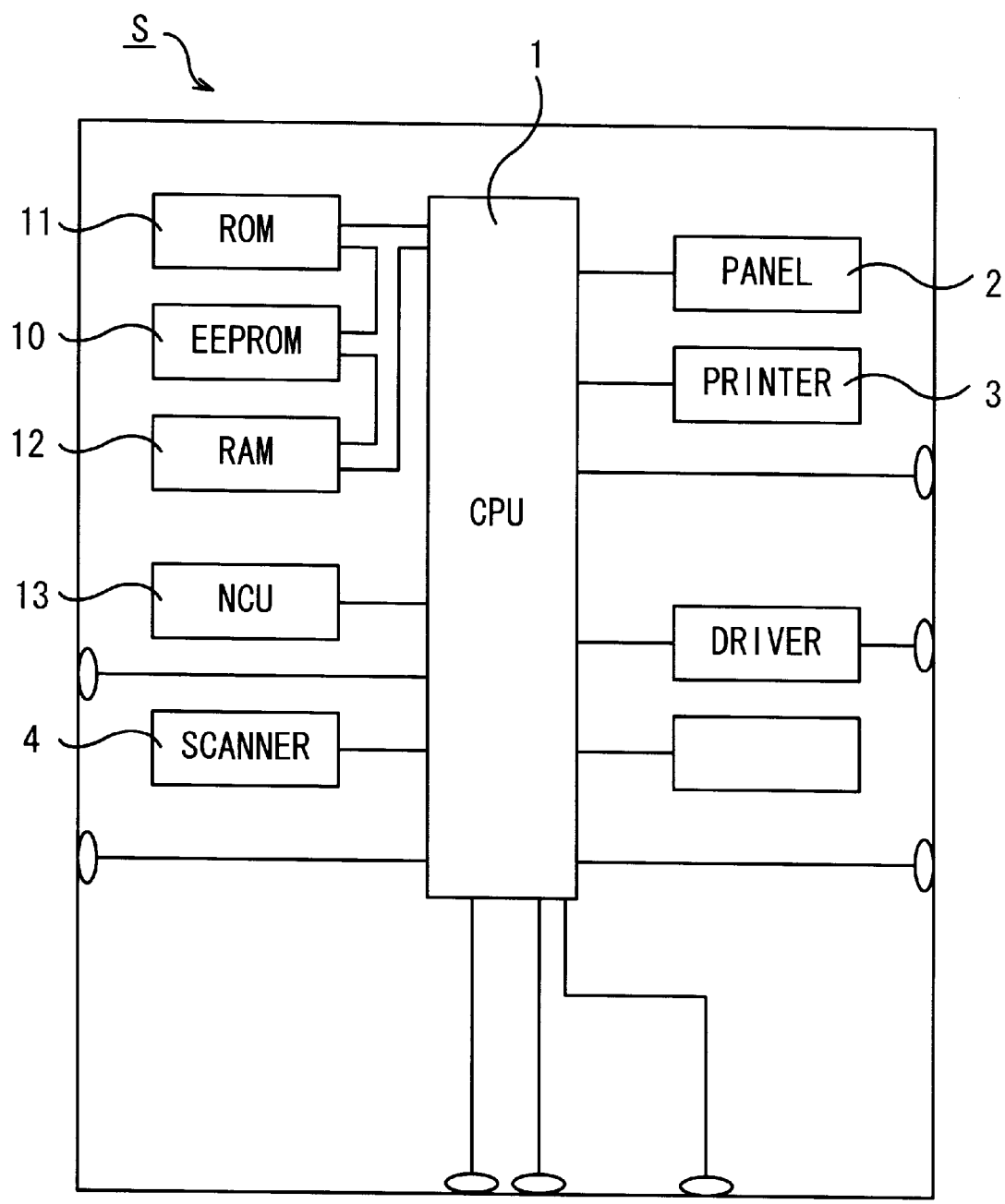
FIG. 1 is a block diagram of an embodiment of the invention.

The invention will be described in conjunction with a multi-function facsimile apparatus S having an EEPROM 10 as shown in FIG. 1, as an example of a data processing apparatus equipped with a writeable/nonvolatile memory device for storing operation setting values.

In accordance with various instructions input by an operator through a panel 2, the multi-function facsimile apparatus S of this embodiment sets an operation mode, reads an original document image using a scanner 4, encodes transmission data, transmits and receives facsimile data, decodes received data, and records the decoded facsimile data onto a recording sheet using a printer 3. The multi-function facsimile apparatus S has a CPU 1, a ROM 11, the EEPROM 10 for storing operation setting values, a RAM 12 in which a part is used as a reception buffer memory, a network control unit (NCU) 13 that enables voice, data and facsimile transmissions with other telephones, facsimiles and the like, a modem (not shown), and bus lines connecting between these components. The RAM 12 is formed of an ordinary DRAM.

If the ROM 11 is replaced for maintenance, repair, design alteration or any other reason, the multi-function facsimile apparatus S writes the initial values of the new ROM 11 into the EEPROM 10 when powered on. This writing operation is performed by the CPU 1 in accordance with a control process.

The EEPROM 10 of the multi-function facsimile apparatus S stores the operation setting values corresponding to the ROM 11 installed in the apparatus S. When powered on, the CPU 1 of the multi-function facsimile apparatus S compares a checksum value which is a total of all of the values stored in ROM 11 and a value stored in a predetermined area in the EEPROM 10. If the checksum value differs from the value stored in the predetermined area of the EEPROM 10, the CPU 1 writes the initial values stored in the ROM 11 into the predetermined area in the EEPROM 10.

The initial values in the multi-function facsimile apparatus S include, for example, reading contrast parameters for the scanner unit and the like, as shown in FIG. 3.

In the multi-function facsimile apparatus S of this embodiment, a two-byte storage area is provided in both the ROM 11 and in the predetermined area in the EEPROM 10 as a checksum storage area The address of the high order byte storage area of the two-byte predetermined storage area of the EEPROM 10 is defined as "ANGOH", and the address of the low order byte storage area thereof is defined as "ANGOH+1".

The operation of the multi-function facsimile apparatus S of this embodiment will now be described with reference to the flowchart of FIG. 2. When power is supplied, in step S1, the CPU 1 compares the value of the high order byte of the checksum stored in the ROM 11 and the value stored in the high order byte (at the address "ANGOH") of the predetermined area in the EEPROM 10, and determines whether the two values are equal.

If it is determined that the value of the high order byte of the checksum stored in the ROM 11 is different from the value stored at the address "ANGOH" in the EEPROM 10 (NO in step S1) (i.e., the storage content of the ROM 11 has been changed due to replacement of ROMs), then in step S2, the EEPROM 10 is initialized. More specifically, the CPU 1 writes the initial setting values stored in the ROM 11 to the EEPROM 10.

After the initialization in step S2, the CPU 1 writes the high and low order bytes of the checksum of the ROM 11 into the EEPROM 10 in step S3. According to this embodiment, the high order byte of the checksum is written into the address "ANGOH", and "AAA" from the RAM 12, which is determined based on the checksum in steps S4, S5 and S6 as described below, is written into the address "ANGOH+1" in the EEPROM 10.

If it is determined in the comparing step Si that the value stored in the high order byte of the checksum equals the value stored at the address "ANGOH" in the EEPROM 10 (YES in step S1), it can basically be determined that the ROM 11 has not been changed. However, the value of the high order byte of the checksum stored in the ROM 11 can equal the value stored at the address "ANGOH" in the EEPROM 10 merely by chance.

For example, the values in the storage areas of the EEPROM 10 are not defined in a stage when the EEPROM 10 is mounted on a circuit board (not shown) during the manufacture of the multi-function facsimile apparatus of this embodiment. The values of the storage areas are often "00" or "FF" in that stage. If the value of the two-byte checksum stored in the ROM 11 happens to be "00" or "FF", the initial setting values of the ROM 11 are not written into the EEPROM 10 although the EEPROM 10 actually does not store the initial setting values stored in the ROM 11. To prevent such incidents, this embodiment performs the operation in step S4 and the subsequent steps illustrated in the flowchart of FIG. 2.

In step S4, a high/low determining operation is performed to determine whether the value of the high order byte and the value of the low order byte of the checksum stored in the ROM 11 are equal. For example, if the checksum value is "00", it is determined in step S4 that the values of the high and low order bytes of the checksum are equal (YES in S4) since they are both "0".

If it is determined in step S4 that the values stored in the high and low order bytes of the checksum of the ROM 11 are equal (YES in S4), a value obtained by adding 1 to the value stored in the low order byte of the checksum of the ROM 11 is stored into an address "AAA" in a storage area of the RAM 12 in step S5. This operation makes it possible to perform proper initialization in step S2 of the EEPROM 10 even in a case where the high order byte and the low order byte of the checksum of the ROM 11 have equal values (that is, where the checksum is, for example, "00", "FF" and so on) and the value stored in the two-byte storage area at the addresses "ANGOH" and "ANGOH+1" in the EEPROM 10 is an undefined value, such as "00", "FF", or the like.

If it is determined in step S4 that the values stored in the high and low order bytes of the checksum of the ROM 11 differ from each other (NO in S4), the value stored in the low order byte of the checksum of the ROM 11 is immediately stored into the address "AAA" in the storage area of the RAM 12 in step S6.

In step S7, it is determined whether the value determined and stored at the address "AAA" in the storage area of the RAM 12 in the preceding step equals the value stored in a predetermined area (at the address "ANGOH+1") in the EEPROM 10. If it is determined in step S7 that the value stored at the address "AAA" in the storage area of the RAM 12 differs from the value stored in the predetermined area (at the address "ANGOH+1") in the EEPROM 10 (NO in step S7), the operation proceeds to step S2, in which CPU 1 initializes and updates the EEPROM 10 with the initial setting values stored in the ROM 11.

In step S3, the value stored in the high order byte of the checksum from the ROM 11 is stored into the address "ANGOH" in the EEPROM 10, and then the value stored at the address "AAA" in the RAM 12 is stored into the address "ANGOH+1" in the EEPROM 10.

If it is determined in step S7 that the value stored at the address "AAA" in the storage area of the RAM 12 equals the value stored at the address "ANGOH+1" in the EEPROM 10 (YES in step S7), no writing operation is performed to the EEPROM 10. Thus, based on the affirmative determinations in steps S1 and S7 indicating that the value stored in the predetermined two-byte area at the addresses "ANGOH" and "ANGOH+1" in the EEPROM 10 equals the value of the checksum stored in the two-byte storage area in the ROM 11, the CPU 1 can determine that the ROM 11 has not been replaced.

In short, in the operation according to this embodiment, the checksum stored in the ROM 11 is stored into the EEPROM 10, and, when power is supplied, these checksum values are compared. If it is determined, on the basis of the comparison, that the ROM 11 has been replaced, the initial values of the new ROM 11 are written into the EEPROM 10. Through this operation, proper operation of multi-function facsimile apparatus S is assured.

In this embodiment, two bytes are used for storing the checksum of the ROM 11, and the value from the low order byte is stored at the address "AAA" in the RAM 12. Two bytes are also provided for the value stored in the predetermined area of the EEPROM 10.

Figure 2:
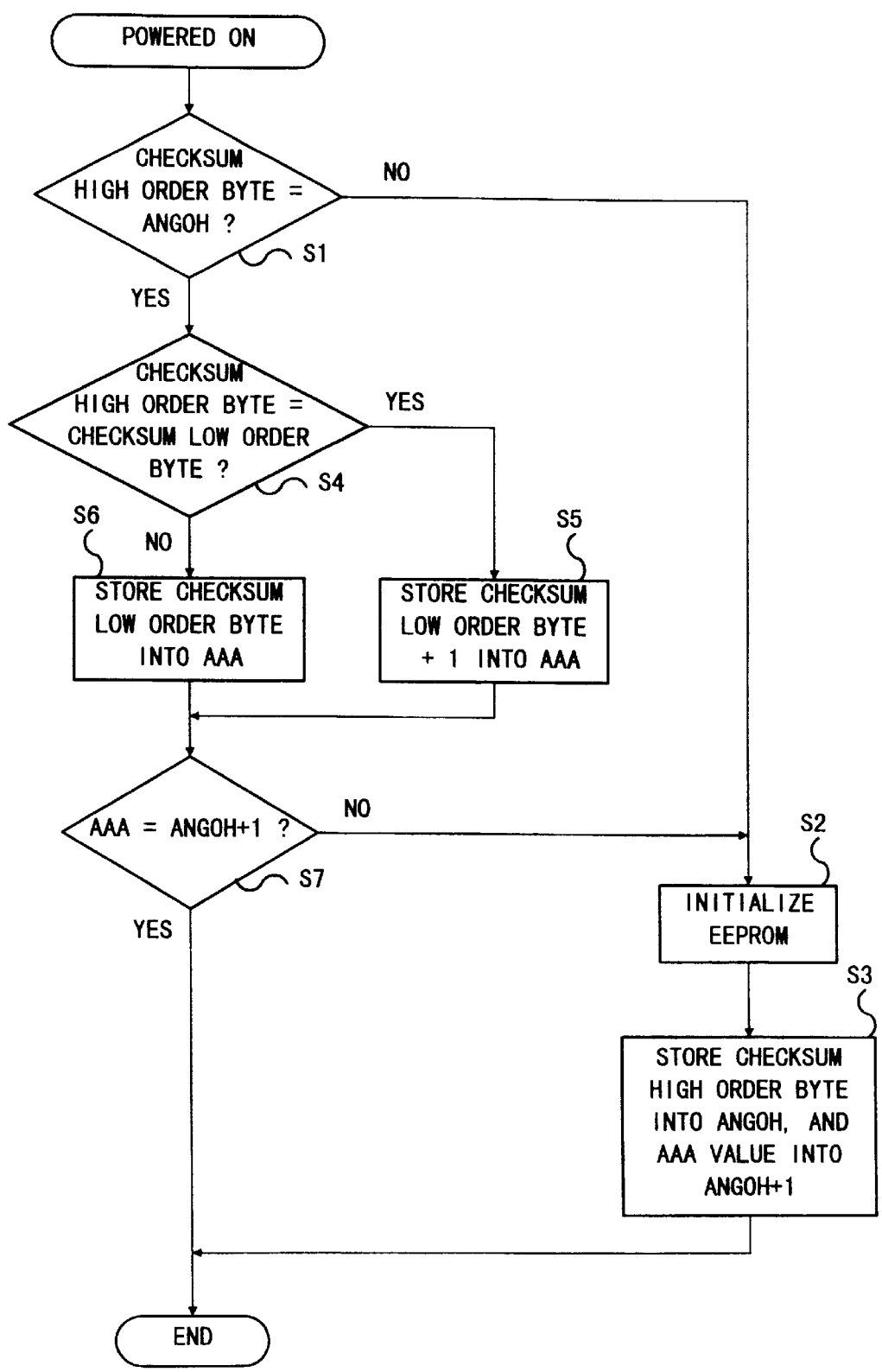
FIG. 2 is a flowchart illustrating the operation of the invention.

Although, as shown in FIG. 2, the addresses of the high and low order bytes of the two bytes are defined as "ANGOH" and "ANGOH+1", respectively, the addresses may also be defined as any given values. In addition, although the foregoing embodiment employs an EEPROM as a writeable and nonvolatile memory device, the writeable and nonvolatile memory device may also be a flash ROM, an ordinary RAM or a DRAM backed up by a battery cell, or the like. Furthermore, although, in the foregoing embodiment, "1" is added to the value stored in the low order byte of the checksum of ROM 11 in step S5, any value may be added. For example, the value added may also be "2", "3", "5" and so on.

It is to be understood that the invention is not restricted to the particular forms shown in the foregoing embodiment. Various modifications and alternatives can be made thereto without departing from the scope of the invention encompassed by the appended claims.

What is claimed is:

1. An apparatus equipped with a writeable/nonvolatile memory comprising:
    a Read-Only Memory (ROM);
    a writeable and nonvolatile memory device that stores an operation setting value;
    a determination device that determines whether there is a change in storage content of the ROM when powered on;
    a first writing device that initializes the memory device by writing an initial value stored in the ROM into the memory device if the determination device determines that there is a change in storage content of the ROM; and
    a second writing device, separate from the first writing device, that writes into the memory device a value to be used in order to determine whether there is a chance in storage content of the ROM, wherein the determination device compares a checksum value stored in the ROM and a value stored in a predetermined area in the memory device when powered on and, if the checksum value differs from the value stored in the predetermined area, the determination device determines that the ROM has been changed.

2. The apparatus of claim 1, wherein the determination device determines whether the ROM has been changed, by comparing a value stored in one high order byte of the checksum stored in the ROM and a value stored in one byte stored in the predetermined area in the writable and nonvolatile memory device, when the apparatus is powered on.

3. The apparatus of claim 1, wherein the second writing device writes into the memory device after the memory device is initialized by the first writing device.

4. The apparatus of claim 1, wherein two bytes are provided for the checksum storage area in the ROM and two bytes are provided for the storage area in the predetermined area in the memory device.

5. The apparatus of claim 4, further comprising a high/low comparison device that compares a value stored in the high order byte of the two-byte storage area for the checksum of the ROM and a value stored in the low order byte of the two-byte storage area for the checksum of the ROM.

6. The apparatus of claim 5, further comprising a second determination device that determines whether the ROM has been replaced by comparing the value stored in the low order byte of the checksum and a value stored in the low order byte of the two-byte storage area of the predetermined area in the memory device if the high/low comparison device determines that the value stored in the high order byte of the checksum differs from the value stored in the low order byte of the checksum, or by comparing a value obtained by adding a predetermined value to the value stored in the low order byte of the checksum and the value stored in the low order byte of the two-byte storage area of the predetermined area in the memory device if the high/low comparison device determines that the value stored in the high order byte of the checksum equals the value stored in the low order byte of the checksum.

7. The apparatus of claim 6, wherein if the second determining device determines that the ROM has been replaced, the second writing device writes the value stored in the low order byte of the checksum of the ROM into the low order byte of the predetermined two-byte storage area in the memory device if the high/low comparison device has determined that the value stored in the high order byte of the checksum of the ROM differs from the value stored in the low order byte of the checksum, or writes the value obtained by adding the predetermined value to the value stored in the low order byte of the checksum of the ROM into the low order byte of the predetermined two-byte storage area in the memory device if the high/low comparison device has determined that the value stored in the high order byte of the checksum of the ROM equals the value stored in the low order byte of the checksum.

8. The apparatus of claim 7, wherein the predetermined value to be added is 1.

9. An initializing method for a writeable and nonvolatile memory device to be performed when an electronic apparatus equipped with the memory device is powered on, comprising:

providing a checksum storage area in a ROM for storing a checksum;

providing a checking storage area in a predetermined area in a writeable and nonvolatile memory device;

comparing a value stored in the checksum storage area in the ROM and a value stored in the checking storage area in the memory device;

initializing the memory device if it is determined in the comparing step that the value stored in the checksum storage area differs from the value stored in the checking storage area; and writing the value stored in the checksum storage area in the ROM into the checking storage area in the memory device, wherein two bytes are provided for the checksum storage area in the ROM and two bytes are provided for the checking storage area in the predetermined area in the writeable and nonvolatile memory device.

10. The method of claim 9, wherein in the comparing step, a value stored in one high order byte of the checksum storage area in the ROM is compared with a value stored in one high order byte of the predetermined area in the memory device, and if it is determined in the comparing step that the value stored in the high order byte of the checksum storage area differs from the value stored in the high order byte of the checking storage area, the memory device is initialized in the initializing step, and the value stored in the high order byte of the checksum storage area in the ROM and a value stored in the low order byte of the checksum storage area are written into the memory device in the writing step.

11. The method of claim 10, further comprising determining whether the value stored in the high order byte of the checksum of the ROM equals the value stored in the low order byte of the checksum in a high/low determining step, if it is determined in the comparing step that the values are equal to each other.

12. The method of claim 11, further comprising comparing a value obtained by adding a predetermined value to the value stored in the low order byte of the checksum with a value stored in the low order byte of the predetermined area of the memory device in a second comparing step, if it is determined in the high/low determining step that the values are equal to each other.

13. The method of claim 12, wherein if it is determined in the second comparing step that the values are different from each other, the memory device is initialized in the initializing step.

14. The method of claim 13, wherein, in the writing step, the value stored in the high order byte of the checksum of the ROM and the value obtained by adding the predetermined value to the low order byte of the checksum are written into the memory device.

15. An apparatus equipped with a writeable/nonvolatile memory comprising:

a Read-Only Memory (ROM) in which a checksum storage area in the ROM for storing a checksum is provided;

writeable/nonvolatile memory means in which a checking storage area in a predetermined area is provided;

comparing means for comparing a value stored in the checksum storage area in the ROM and a value stored in the checking storage area in the writeable/nonvolatile memory means; and writing means for initializing the writeable/nonvolatile memory means if it is determined by the comparing means that the value stored in the checksum storage area differs from the value stored in the checking storage area by writing the value stored in the checksum storage area in the ROM into the checking storage area in the writeable/nonvolatile memory means, wherein two bytes are provided for the checksum storage area in the ROM and two bytes are provided for the checking storage area in the writeable/nonvolatile storage means.

16. A storage medium for storing programs for initializing a writeable and nonvolatile memory device to be performed when an electronic apparatus equipped with the memory device is powered on, comprising:

a program for providing a checksum storage area in a ROM for storing a checksum;

a program for providing for checking storage area in a predetermined area in a writeable and nonvolatile memory device;

a program for comparing a value stored in the checksum storage area in the ROM and a value stored in the checking storage area in the memory device;

a program for initializing the memory device if it is determined in the program for comparing that the value stored in the checksum storage area differs from the value stored in the checking storage area; and a program for writing the value stored in the checksum storage area in the ROM into the checking storage area in the memory device, wherein two bytes are provided for the checksum storage area in the ROM and two bytes are provided for the checking storage area in the predetermined area in the writeable and nonvolatile memory device.

17. The storage medium of claim 16, wherein in the program for comparing, a value stored in one high order byte of the checksum storage area in the ROM is compared with a value stored in one high order byte of the predetermined area in the memory device, and if it is determined in the program for comparing that the value stored in the high order byte of the checksum storage area differs from the value stored in the high order byte of the checking storage area, the memory device is initialized in the program for initializing, and the value stored in the high order byte of the checksum storage area in the ROM and a value stored in the low order byte of the checksum storage area are written into the memory device in the program for writing.

18. The storage medium of claim 17, further comprising a program for determining whether the value stored in the high order byte of the checksum of the ROM equals the value stored in the low order byte of the checksum, if it is determined in the program for comparing that the values are equal to each other.

19. The storage medium of claim 18, further comprising a program for comparing a value obtained by adding a predetermined value to the value stored in the low order byte of the checksum with a value stored in the low order byte of the predetermined area of the memory device, if it is determined in the program for determining that the values are equal to each other.

20. The storage medium of claim 19, wherein if it is determined in the program for comparing that the values are different from each other, the memory device is initialized in the program for initializing.

21. The storage medium of claim 20, wherein, in the program for writing, the value stored in the high order byte of the checksum of the ROM and the value obtained by adding the predetermined value to the low order byte of the checksum are written into the memory device.

* * * * *